United States Patent
Bliss et al.

[11] Patent Number: 6,132,104
[45] Date of Patent: Oct. 17, 2000

[54] DETACHABLE PLUG-IN PUMP CARD ASSEMBLY

[75] Inventors: Jody T. Bliss, Rock Stream; Edward F. Murphy; Todd M. Wetherill, both of Painted Post, all of N.Y.

[73] Assignee: Corning Incorporated, Corning, N.Y.

[21] Appl. No.: 09/451,751

[22] Filed: Nov. 30, 1999

Related U.S. Application Data

[60] Provisional application No. 60/110,633, Dec. 2, 1998.

[51] Int. Cl.[7] ............................... G02B 6/36; H01S 3/02
[52] U.S. Cl. ............................... 385/53; 385/135; 372/38
[58] Field of Search .................................. 385/14, 15, 53, 385/88, 134–137, 139, 147; 372/33, 34, 36, 38, 69, 109

[56] References Cited

U.S. PATENT DOCUMENTS

| | | | |
|---|---|---|---|
| 4,527,285 | 7/1985 | Kekas et al. | 455/607 |
| 5,198,684 | 3/1993 | Sudo | 257/79 |
| 5,469,526 | 11/1995 | Rawlings | 385/135 |
| 5,475,592 | 12/1995 | Wnuk et al. | 364/424.05 |
| 5,594,748 | 1/1997 | Jabr | 372/38 |
| 5,659,641 | 8/1997 | DeMeritt et al. | 385/14 |
| 5,727,110 | 3/1998 | Smith et al. | 385/147 |
| 5,737,194 | 4/1998 | Hopkins et al. | 361/800 |
| 5,764,826 | 6/1998 | Kuhara et al. | 385/24 |
| 5,778,132 | 7/1998 | Csipkes et al. | 385/135 |
| 5,917,648 | 6/1999 | Harker | 385/134 X |

*Primary Examiner*—John D. Lee
*Attorney, Agent, or Firm*—Silvy A. Murphy

[57] ABSTRACT

A detachable plug-in pump laser card assembly for placement into an optical fiber amplifier, comprising: a printed circuit board, a heat sink, a pump laser, a first half plug-in member of an optical connector, a second half plug-in member of an electrical connector and a reel having an optical fiber wrapped there around. The heat sink is substantially parallel to the printed circuit board and is separated from the printed circuit board by spacers. The pump laser is connected to one side of the heat sink, which has a plurality of fins on an opposite side from where the pump laser is connected. The first half plug-in member of the optical connector and the second half plug-in member of the electrical connector are each secured to the printed circuit board and are located at an insertion end of the pump laser card assembly. The reel is disposed between the printed circuit board and the heat sink and the optical fiber wrapped around the reel has a first end connected to the pump laser and a second end connected to the first half plug-in member of the optical connector. The detachable plug-in pump laser card assembly is plugged into a port located on a base plate of the optical fiber amplifier, where the first half plug-in member of the optical connector optically engages with a mating member and where the second half plug-in member of the electrical connector electrically engages with a mating member.

26 Claims, 5 Drawing Sheets

DETACHABLE PLUG-IN PUMP CARD ASSEMBLY

This application claims the benefit under 35 U.S.C. § 119(e) of U.S. Provisional Application Ser. No. 60/110,633, filed on Dec. 2, 1998.

FIELD OF THE INVENTION

The present invention relates to opto-electronic devices, which include a pump laser. While the invention may be used in a wide range of opto-electronic devices, it is especially suited for use in an optical fiber amplifier system, and will be particularly described in that connection.

BACKGROUND INFORMATION

Semiconductor pump lasers are used in fiber-optic communication systems, such as optical fiber amplifiers. A pump laser is used to pump a rare earth doped optical fiber amplifier, whereby the pump laser excites the atoms in the optical fiber to a higher energy level. The excited atoms in the optical fiber release energy upon return to a lower energy level, which energy is used to amplify a weak transmission signal. A pump laser is normally sealed in a butterfly package having a pigtail, that is, a short length of optical fiber extending from the pump laser. Ordinarily, a pump laser is permanently connected or wired into an optical fiber amplifier system. In particular, the pump laser electronics are physically soldered to the amplifier circuitry and the pigtail is fusion spliced to the optical fiber amplifier. Fusion splicing entails melting the ends of two fibers together. Splicing results in a permanent connection and generally results in a lower attenuation (loss) of an optical signal.

A pump laser operates continuously to pump the amplifying fiber and, accordingly, is a crucial component of an optical fiber amplifier. With permanent connections of the pump laser in an optical fiber amplifier, such as, the splicing of the optical components and the soldering of the electrical components, a pump laser failure generally requires replacing the optical fiber amplifier or else completely dismantling the failed optical fiber amplifier to access the pump laser. The process of dismantling the failed optical fiber amplifier and replacing the pump laser and then re-assembling the failed optical fiber amplifier in the field can be labor intensive, lengthy, unreliable and expensive. Additionally, spare completely assembled optical fiber amplifiers must be kept in inventory. Consequently, usually for reliability issues, it is much more cost effective to replace the entire failed optical fiber amplifier itself in order to reduce the down time of the optical telecommunication system, rather than to try and dismantle the failed amplifier to replace a pump laser. Alternatively, in the optical amplifier manufacturing process, the failed optical fiber amplifier and its components can be used for scrap parts by the manufacturer.

Another problem associated with the present construction of optical fiber amplifiers relates to the mounting and fusion splicing of the pump laser. For example, if the ends of the pigtail fiber from the pump laser and the amplifying fiber are not aligned properly for fusion splicing, this could amount to an appreciable signal loss. Short of accepting such losses in signal due to any such misalignment, one alternative is to repeat the fusion splicing process to ensure that the pump laser will operate effectively and efficiently.

In light of the foregoing, it is desirable to provide an arrangement where a pump laser can be physically removed with ease from an optical fiber amplifier for servicing, modification, testing, manufacturing and/or replacement. Also, it is desirable to provide a non-permanent way of optically connecting and/or disconnecting, as well as, electrically connecting and/or disconnecting a pump laser from an optical fiber amplifier for servicing, modification, testing, manufacturing and/or replacement. In addition, it is desirable to provide for multiple attempts for optically connecting a pump laser to an optical fiber amplifier. Furthermore, it is desirable to provide an optical fiber amplifier where the various optical and electrical components are separated from the heat generated by a pump laser.

SUMMARY OF THE INVENTION

Accordingly, the present invention is directed to an opto-electronic device that substantially obviates one or more of the limitations and disadvantages of the related art. The principal advantage of the present invention is the provision of an arrangement which overcomes the limitations and disadvantages of the described prior arrangements. Additional features and advantages of the invention will be set forth in the description that follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described, the opto-electronic device is a detachable plug-in pump laser card assembly that can be inserted and removed from the optical fiber amplifier. The detachable plug-in pump laser card assembly is an assembled unit that has an insertion end and a removable end and is comprised of: a printed circuit board, a pump laser, a heat sink, a first half plug-in member of an optical connector, a first half plug-in member of an electrical connector and a reel with an optical fiber wrapped there around. In particular, one surface of the pump laser package is attached to the heat sink and an opposite surface of the pump laser package is proximate to and substantially parallel to, as well as electrically connected to the printed circuit board. The reel is disposed between the printed circuit board and the heat sink. Further, the optical fiber that is wrapped around the reel is connected to the pump laser at a first end and to the first half plug-in member of the optical connector at a second end. The first half plug-in member of the optical connector is secured to the printed circuit board at the insertion end for removable engagement with a mating member. Also, the first half plug-in member of the electrical connector is secured to the printed circuit board at the insertion end for removable engagement with a mating member. The detachable plug-in pump laser card assembly also has a cover plate attached to the removable end, which plate has a withdrawing member in the form of a handle and at least one light emitting diode.

In another aspect, the present invention provides an optical fiber amplifier that includes a detachable plug-in pump laser card assembly. The optical fiber amplifier has a base plate that comprises a first port which is the space defined by a back wall, a first side wall, and a first side of a middle wall. The first side wall is attached to a first end s of the back wall and the middle wall is attached to the center of the back wall. The first side wall is substantially parallel to the middle wall and each is attached to the back wall. Further, the back wall is bent about 90° at the top and forms a ledge that is attached at the insertion end to the side of the heat sink that comprises a plurality of fins. The first side wall comprises a first side rail member facing the inside of the first port and the first side of the middle wall comprises a first middle rail member facing the inside of the first port, the first middle rail member being opposite from the first side rail member. These rail members support the outer edges of the heat sink and help guide the detachable plug-in pump laser card assembly into and out of the port. Furthermore, the base plate comprises a second half plug-in member of the optical connector that is connected to an optical connector coupling that is mounted onto the back wall of the port and the base plate also comprises a second half plug-in member of the electrical connector that is mounted onto the base plate. When the detachable plugin pump laser card assembly is completely inserted into the port, the first half plug-in member of the optical connector located on the printed circuit board is optically coupled to the second half plug-in member of the optical connector that is mounted on the back wall of the port. Furthermore, the first half plug-in member of the electrical connector located on the printed circuit board is electrically coupled to the second half plug-in member of the electrical connector located on the base plate.

In yet another embodiment, the optical amplifier further includes a second port for inserting a second detachable plug-in pump laser card assembly. The second port is next to the first port and is defined by a second side of the middle wall, a second side wall and the back wall. In addition, the second side wall comprises a second side rail member facing the inside of the second port and the second side of the middle wall includes a second middle rail member facing the inside of the second port, the second middle rail member being opposite to the second side rail member. Accordingly, a second detachable plug-in pump laser card assembly that is comparable in construction to the detachable plug-in pump laser card assembly previously described, can be inserted into the second port.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrating embodiments of the invention, and together with the description serve to explain the objects, advantages, and principles of the invention.

DESCRIPTION OF THE PREFERRED EMBODIMENTS

The invention disclosed herein generally embodies the provision of an optical fiber amplifier having a detachable plug-in pump laser card assembly. More specifically, an aspect of the invention resides in providing a detachable plug-in pump laser card assembly, whereby the detachable plug-in pump laser card assembly can be easily inserted and removed from the optical fiber amplifier in order to enable access to the pump laser. As used herein, the term "detachable plug-in pump laser card assembly" refers to an assembled unit comprised of various elements, including a pump laser, which is capable of being inserted into and removed from an optical fiber amplifier.

Figure 1:
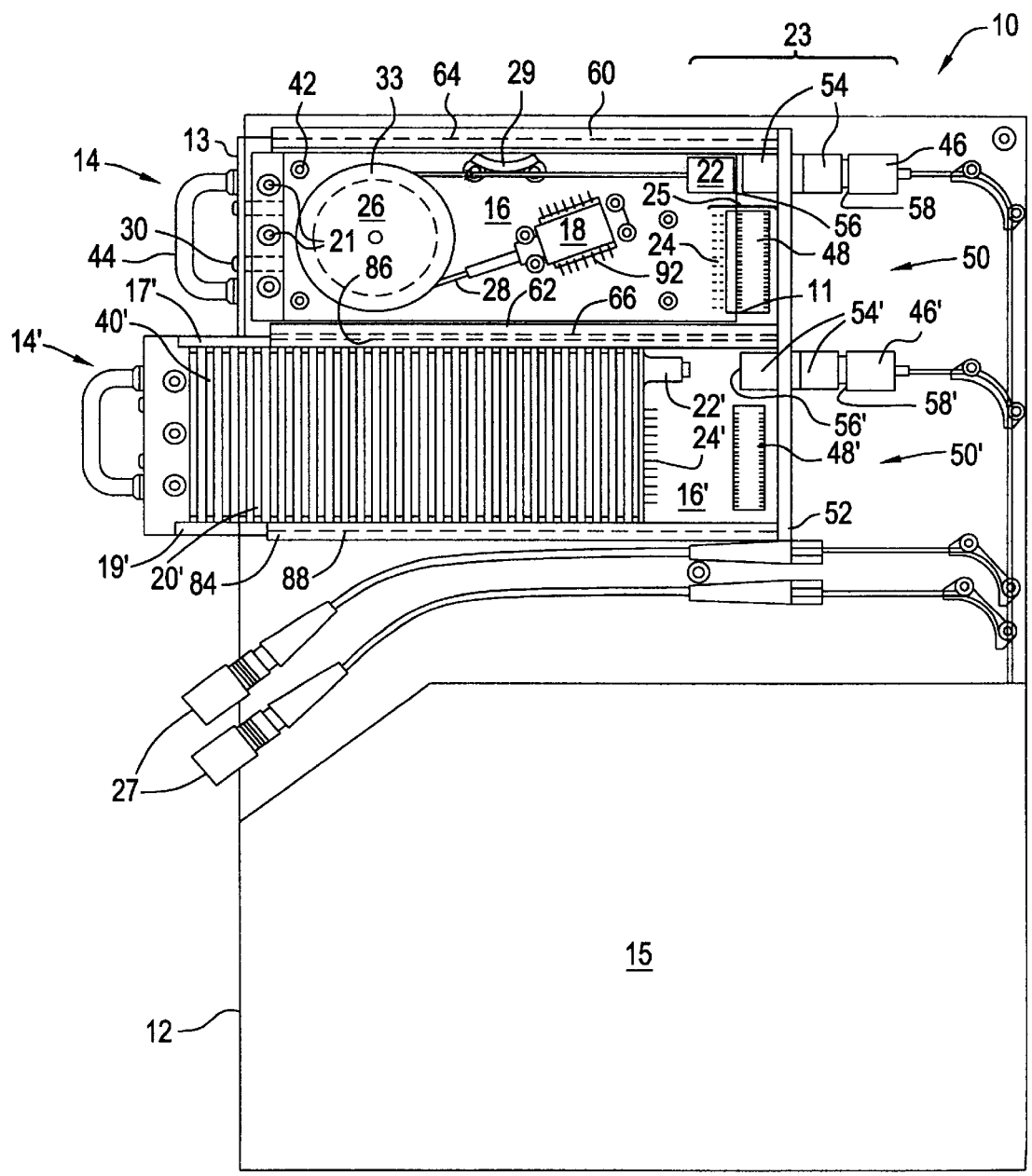
FIG. 1 is a top view of an optical fiber amplifier showing components in accordance with an embodiment of the present invention.

Reference will now be made in detail to the present preferred embodiments of the invention, examples of which are illustrated in the accompanying drawings. Turning to the drawings, like numerals indicate the same or similar elements in each of the several views. The drawings are not intended to indicate scale or relative proportions of the elements shown therein. The optical fiber amplifier of the present invention is shown in FIG. 1 and is designated generally by reference numeral 10. The reference numeral 15 indicates the location of the additional standard amplifier components (not shown in any of the diagrams) which are used to manufacture the optical amplifier 10, including a rare-earth doped optical fiber used to amplify an optical signal in the optical fiber amplifier 10. The optical fiber amplifier 10 is connected to a network by an input plug and an output plug, both of which are designated by the numeral 27. In the preferred embodiment, the optical fiber used (not shown) in the optical fiber amplifier 10 is doped with the rare-earth element erbium. However, the optical fiber may be doped with other rare-earth elements that can produce optical gain in the optical fiber. FIG. 1 depicts a top view of an optical fiber amplifier having two detachable plug-in pump laser card assemblies, 14 and 14'. The prime symbol next to numerals indicates the same or similar elements that are associated with the second detachable plug-in pump laser card assembly 14' shown in FIGS. 1 and 2.

Referring to FIG. 1, the optical fiber amplifier 10 includes a base plate 12, which in the preferred embodiment is a commercially available printed circuit board. The base plate 12 incorporates all of the amplifier components, including the pair of detachable plug-in pump laser card assemblies 14 and 14'. The detachable plug-in pump laser card assembly 14 is received in the first port 50 and the second detachable plug-in pump laser card assembly 14' is received in the second port 50'. The detachable plug-in pump laser card assemblies 14 and 14' are preferably identically constructed of suitable materials, and respectively include commercially available printed circuit boards 16 and 16' and heat sinks 20 (not shown in FIG. 1) and 20'. The heat sinks 20 and 20' are made of a thermal conductive material, preferably a metal, most preferably aluminum, or any other material having a thermal conductivity approximately equal to or greater than aluminum. FIG. 1 depicts the detachable plug-in pump laser card assembly 14 without its heat sink 20 to show how the various elements interconnect when the pump laser card assembly 14 is completely inserted into a first port 50 of the amplifier 10. Further, FIG. 1 shows the second detachable plug-in pump laser card assembly 14' with its heat sink 20' and shows the second detachable plug-in pump laser card assembly 14' in a partially removed position in a second port 50' of the optical amplifier 10 in order to show the various elements when disconnected. Since the detachable plug-in pump laser card assembly 14 is identical in construction to the second detachable plug-in pump laser card assembly 14', the description will, at times, alternate between the detachable plug-in pump laser card assembly 14 and the second detachable plug-in pump laser card assembly 14', and the corresponding elements associated therewith.

Figure 3:
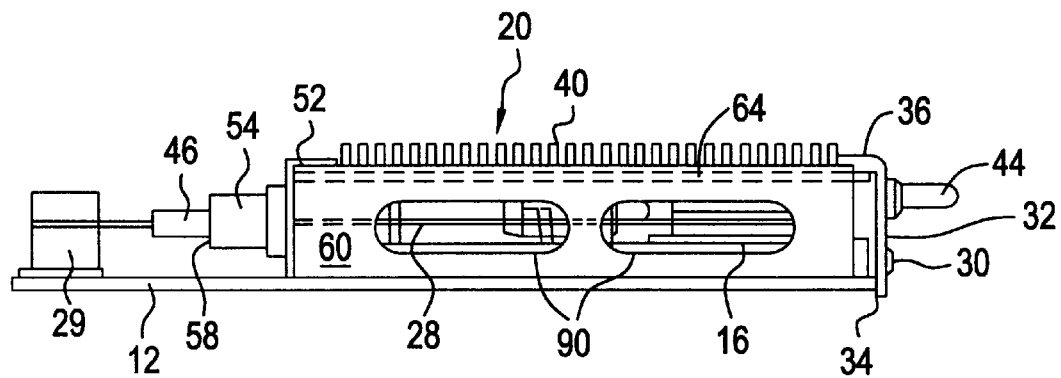
FIG. 3 is a side view of the embodiment of FIG. 1.
Figure 4:
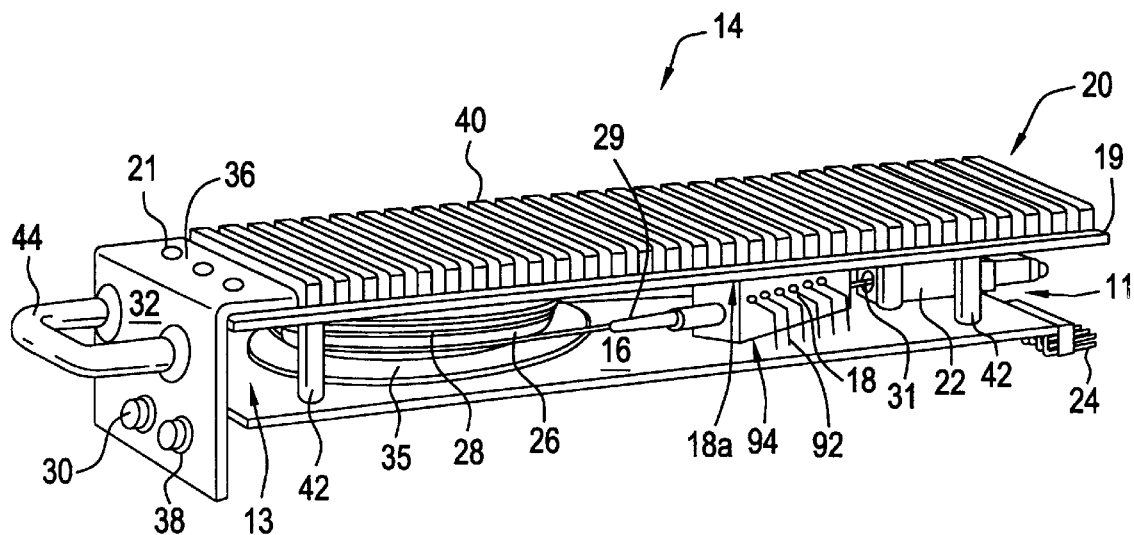
FIG. 4 is a perspective view of a detachable plug-in pump laser card assembly for use in the optical fiber amplifier shown in FIG. 1.

As shown in FIGS. 1 and 4, the detachable plug-in pump laser card assembly 14 has an insertion end 11 that is inserted into the first port 50 and a removable end 13. The detachable plug-in pump laser card assembly 14 includes the following elements: a printed circuit board 16, a pump laser 18, a heat sink 20, a first half plug-in member 22 of an optical connector 23, a first half plug-in member 24 of an electrical connector 25, and a reel 26 with an optical fiber 28 wrapped there around. As shown in FIG. 4, the printed circuit board 16 and the heat sink 20 are substantially parallel to each other. One surface of the pump laser 18, namely the base 18a which has a thermal electric cooler and a semiconductor chip mounted thereon, is connected to the side of the heat sink 20 facing the printed circuit board 16. Thus, the thermal electric cooler and the semiconductor chip components located within the pump laser 18 are proximate to the heat sink 20. The pump laser 18 is connected to the heat sink 20 by the use of fasteners, such as metal screws. The opposite surface of the pump laser 18 has electrical leads 92 extending therefrom which are electrically connected, preferably by soldering, to the circuitry of the printed circuit board 16. There is a gap 94 between the pump laser 18 and the printed circuit board 16, which prevents direct contact of the body of the pump laser 18 with the circuitry of the printed circuit board 16. This particular arrangement ensures that any heat generated by the pump laser 18 within the detachable plug-in pump laser card assembly 14 is removed from the detachable plug-in pump laser card assembly 14 by convection of air circulating on a plurality of fins 40 attached to the heat sink 20. As shown in FIGS. 1, 3 and 4, the plurality of fins 40 are located on the top side of the heat sink 20, facing the outside of the detachable plug-in pump laser card assembly 14, and are on an opposite side of the heat sink 20 from where the pump laser 18 is flushly attached. As shown by the detachable plug-in pump laser card assembly 14 in FIG. 1, the fins 40' cover that entire side of the heat sink 20', except for the side edges 17' and 19' of the heat sink 20'. The fins 40' are designed to remove the heat generated by the pump laser 18' and help maintain an acceptable operating temperature in and around the detachable plug-in pump laser card assembly 14'. In the preferred embodiment, the heat sinks 20 and 20' are made of aluminum, which has a high thermal conductivity. However, other suitable materials can be substituted by one of ordinary skill in the art. Furthermore, FIG. 1 shows the fins 40' traversing the width of the detachable plug-in pump laser card assembly 14'. However, alternatively, the fins 40' could traverse the length of the detachable plug-in pump laser card assembly 14'. Also, as shown in FIG. 4 the heat sink 20 is separated from the printed circuit board 16 by a plurality of thermally insulating spacers 42, preferably constructed from a low thermal conductivity material such as a polymer, ceramic, or even stainless steel. The spacers 42 are located between the printed circuit board 16 and the heat sink 20, thus, preventing any direct contact between the heat sink 20 and the printed circuit board 16 and minimizing transfer of any heat. Furthermore, as shown in FIG. 4, the first half plug-in member 22 of the optical connector 23 is attached and positioned at the insertion end 11 of the printed circuit board 16 and the first half plug-in member 24 of the electrical connector 25 is also attached and positioned at the insertion end 11 of the printed circuit board 16. Such positioning of the first half plug-in member 22 of the optical connector 23 and the first half plug-in member 24 of the electrical connector 25 facilitates engagement and disengagement of the detachable plug-in pump laser card assembly 14.

Figure 5:
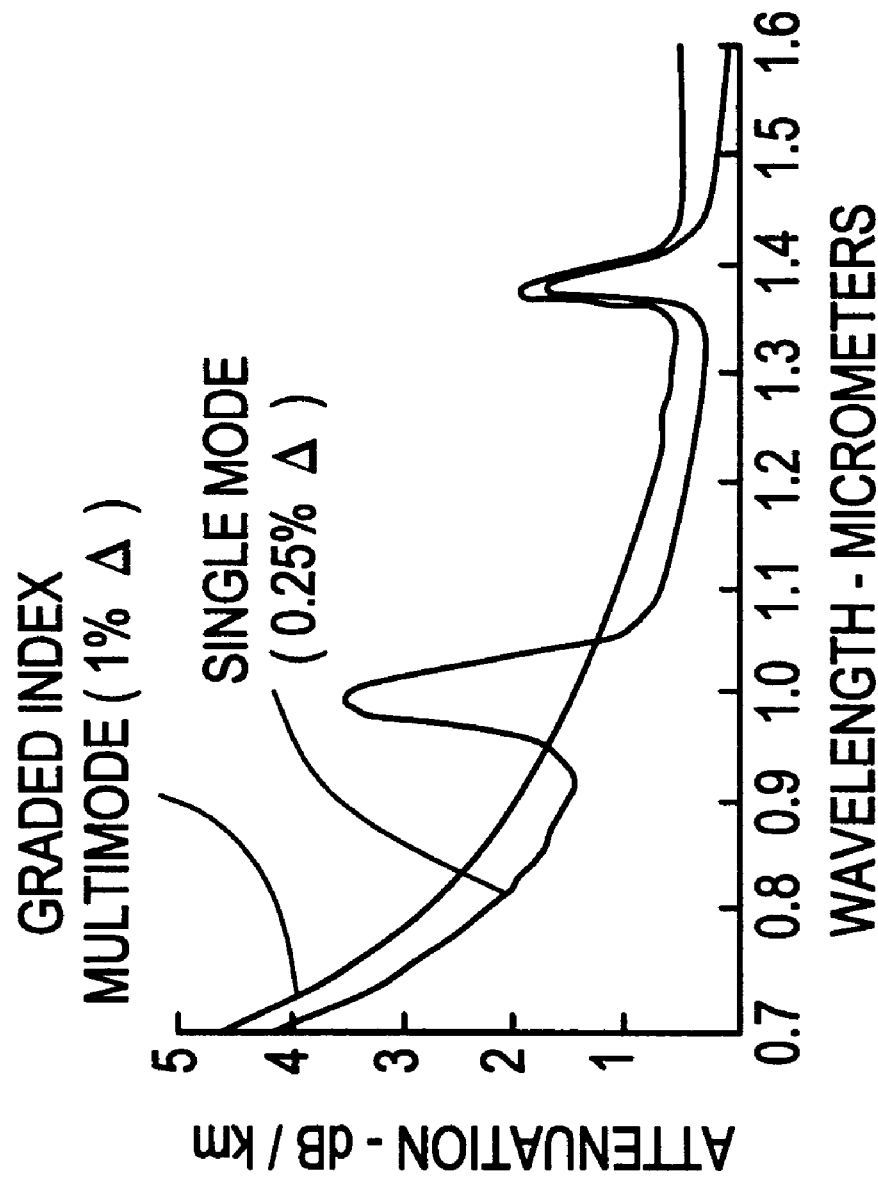
FIG. 5 is a Raleigh scattering curve showing attenuation as a function of wavelength for a straight optical fiber.
Figure 6:
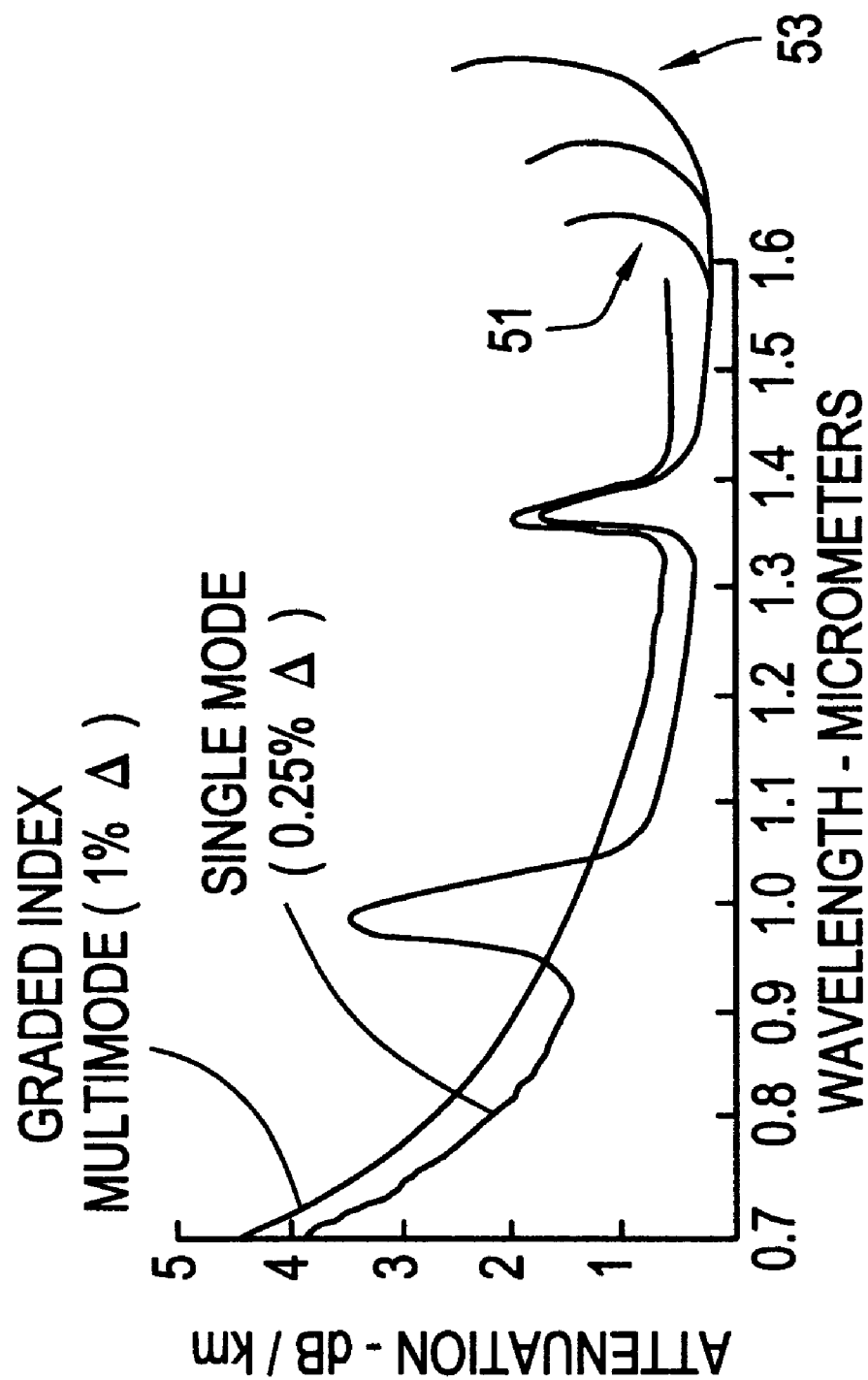
FIG. 6 is a Raleigh scattering curve showing attenuation as a function of wavelength for a bent optical fiber.

In the detachable plug-in pump laser card assembly 14, as shown in FIGS. 1 and 4, the reel 26 is secured between the printed circuit board 16 and the heat sink 20. The reel 26 also has an upper flange 33 abutting the heat sink 20 and a lower flange 35 abutting the printed circuit board 16. The reel 26 has the optical fiber 28 wrapped around it. Typically, the optical fiber 28 is a single-mode optical fiber. Also, the reel 26 has a minimum bend diameter corresponding to the pump wavelength of the single-mode optical fiber 28 being utilized in the optical fiber amplifier 10. The minimum bend diameter of the reel 26 ensures that there is no appreciable attenuation. In general, for an optical fiber having a given wavelength of operation that is laid out in a straight line, there is normally a decrease in attenuation at increasing wavelengths. This occurrence is graphically shown in FIG. 5 and is known as a Raleigh scattering curve. The curve depicts a decrease in attenuation at increasing wavelengths in the form of a smooth decreasing exponential curve for the most part, except at approximately 1000 nanometers and 1380 nanometers due to absorption edges of water and/or materials used in manufacturing the optical fiber. When an optical fiber is bent, there is an appreciable increase in attenuation at increasing wavelengths and, accordingly, the decreasing exponential curve exhibits a sharp rise at increasing wavelengths, as shown in FIG. 6. The point where the curve rises sharply is defined as a bend edge of the fiber. The bend edge depends on the optical fiber wavelength, which in turn also dictates the minimum bend diameter for a reel around which the fiber is wrapped. As shown in FIG. 6, the numeral 51 is indicative of a bend edge for a reel of fiber having a relatively small diameter, whereas the numeral 53 is indicative of a bend edge for a reel of fiber having a relatively large diameter. Depending on the given wavelength of optical fiber being used, it is preferable that the bend edge not appear near the given pump wavelength, but preferably outside the given wavelength. Furthermore, the minimum bend diameter of the reel will also depend upon a variety of other factors, including fiber strength, the wavelength of light transmitted, tension on the optical fiber and fiber coating, index of refraction of the optical fiber core and cladding, and can be established by one skilled in the art.

Additionally, as shown in FIG. 4, the optical fiber 28 having a first end 29 and a second end 31 is wrapped around the reel 26. The first end 29 of the optical fiber 28 is connected to the pump laser 18 and extends to the reel 26, where the optical fiber 28 is wrapped around the reel 26 at least once, preferably at least twice, and most preferably at least thrice to provide a reservoir of the optical fiber 28 and then culminates at a second end 31, which is connected to the first half plug-in member 22 of the optical connector 23. The optical fiber 28 wound about the reel 26 provides a surplus of optical fiber 28 to facilitate assembly rework when splicing the first half plug-in member 22 of the optical connector 23 with a pigtail fiber extending from the pump laser 18. For example, if the first attempt at splicing the optical connector with the pigtail fiber of the pump laser 18 results in high optical loss, the optical connector 23 can be re-spliced or even cut off and replaced with another optical connector given that there is a reservoir of optical fiber 28 wrapped around the reel 26. The reservoir of optical fiber 28 has an aggregate length at least equal to the sum of a first distance from the pump laser 18 to the reel 26, a second distance around the perimeter of the reel 26, and a third distance from the reel 26 to the first half plug-in member 22 of the optical connector 23. Further, the design of the detachable pump laser card assembly 14 provides for the placement of the reel 26 in such a fashion that the optical fiber 28 provides a tangential path from the reel 26 to the pump laser 18 as well as a tangential path from the reel 26 to the first half plug-in member 22 of the optical connector 23, thus, ensuring there is a minimum loss of an optical signal traveling down the optical fiber 28 caused by any bends in the optical fiber 28. Also, as shown in FIG. 1, a fiber guide member 29 is provided to secure the optical fiber 28 within the detachable plug-in pump laser card assembly 14 and to prevent any further bends in the optical fiber 28. In the present embodiment, the reel 26 is secured to the detachable plug-in pump laser card assembly by a metal screw traversing the center of the reel 26. However, other securing means, such as epoxy can be substituted. Furthermore, the reel 26 is preferably constructed from a low thermal expansion and low thermal conductivity material, such as a polymer. Although reel 26 is shown in the present embodiment as being circular with the upper flange 33 and the lower flange 35, alternatives, such as a split reel, or a racetrack configuration or a split semi-circular device with a mechanical adjust or any other such device that can accommodate the prescribed aggregate length of optical fiber 28 can be substituted in the present invention. Moreover, as shown in FIGS. 1–4, the printed circuit board 16 has two light emitting diodes 30 that are secured directly to the removable end 13 of the printed circuit board 16'. The light emitting diodes 30 are electrically coupled to the printed circuit board 16 and, thus, the light emitting diodes 30 provide an indication of whether or not proper electrical connections have been made when the detachable plug-in pump card assembly 14 is inserted into the optical fiber amplifier 10. Alternative indicator means for the purpose of monitoring electrical connections will be apparent to those skilled in the art.

Figure 2:
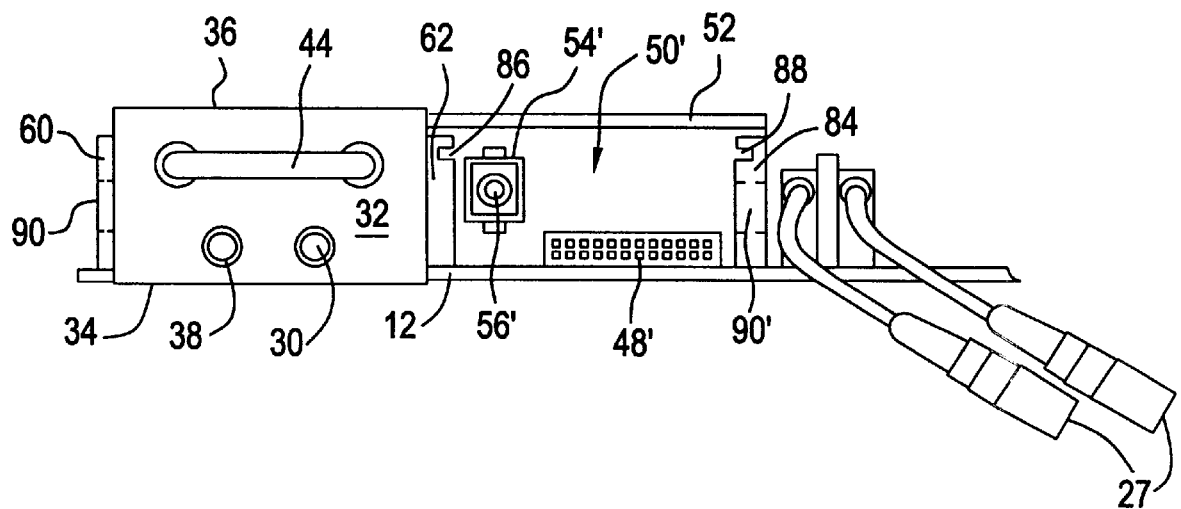
FIG. 2 is a partial front view illustrating the embodiment of FIG. 1.

Referring to FIGS. 1 and 2, a second port 50' is adjacent to the first port 50 and is shown to share a middle wall 62, which separates the first port 50 from the second port 50'. Furthermore, the first port 50 and the second port 50' share a single back wall 52, which is bent about 90° at the top and forms a ledge that is attached at the insertion end 11 to the side of the heat sink 20' that comprises the plurality of fins 40. Specifically, the first port 50 is defined by a first half section of the back wall 52, a first side wall 60 and a first side of the middle wall 62, whereas, the second port 50' is defined by a second half section of the back wall 52, a second side of the middle wall 62 and a second side wall 84. Further, as shown in FIG. 1, the first side wall 60 is connected to a first end of the back wall 52, the middle wall 62 is connected to the center of the back wall 52, and the second side wall 84 is connected to an opposite second end of the back wall 52. The first side wall 60 is substantially parallel to both the middle wall 62 and to the second side wall 84. As shown in FIG. 1, the first side wall 60 includes a first side rail member 64 facing the inside of the first port 50 and the first side of the middle wall 62 facing the inside of the first port 50 includes a first middle rail member 66, which is opposite from the first side rail member 64. Furthermore, the second side of the middle wall 62 facing the inside of the second port 50', includes a second middle rail member 86. Also, the second side wall 84 includes a second side rail member 88 facing the inside of the second port 50' and opposite from the second middle rail member 86. The rail members 64, 66, 86 and 88 help guide the detachable plug-in pump laser card assemblies 14 and 14' into and out of the ports 50 and 50', respectively. Moreover, the attachment of the walls 60, 62 and 84 to the back wall 52 bolster the rail system to ensure precise optical and electrical engagements. In the preferred embodiment, the two ports 50 and 50' defined by the back wall 52, the first side wall 60, the middle wall 62, and the second side wall 84 are all preferably made of a one-piece metal construction, preferably a machinable sheet material, such as stainless steel that compensates for any heat generated by any of the various electronic components of the optical fiber amplifier 10, as well as offers structural integrity and low friction resistance. The type of material used for manufacturing the rail members 64, 66, 86 and 88 is important. Specifically, since the rail members 64, 66, 86 and 88 are incorporated within the walls 60, 62 and 84, in order to facilitate the insertion and removal of the detachable plug-in pump laser card assemblies 14 and 14', it is advantageous to use a material that provides low friction resistance, for instance, stainless steel. However, other suitable materials, such as plastic can be substituted for the structure of the various walls 52, 60, 62 and 84 of the two respective ports 50 and 50'.

Since the remaining construction of the first port 50 and the second port 50' are similar, the description will, at times, alternate between the first port 50 and the second port 50', and the corresponding elements associated therewith. As shown in FIGS. 1 and 2, the back wall 52 in the second port 50' has an optical connector coupling 54' mounted therethrough. The optical connector coupling 54 has a first end 56, which is the end facing the inside of the first port 50, and the optical connector coupling 54 has a second end 58, which is the end facing outside of the first port 50. The second end 58 of the optical connector coupling 54 is connected to a second half plug-in member 46 of an optical connector 23. The base plate 12 includes a second half plug-in member 48 of an electrical connector 25 for engagement with its corresponding mating member, namely, the first half plug-in member 24 of the electrical connector 25, which is located on the detachable plug-in pump laser card assembly 14. When the second detachable plug-in pump laser card assembly 14' is completely inserted into the second port 50', the first half plug-in member 22' of the optical connector 23' becomes engaged with the second half plug-in member 46' of the optical connector 23'. In particular, as shown in FIG. 1, the first half plug-in member 22 of the detachable plug-in pump laser card assembly 14 plugs into the first end 56 of the optical connector coupling 54, which provides coupling between the first half plug-in member 22 and the second half plug-in member 46 of the optical connector 23. The optical connector 23, which includes members 22, 54 and 46, and the optical connector 23', which includes members 22', 54' and 46' are basically low loss ferrule type connectors, preferably, angled contact type connectors that are commercially available from Molex Inc. Besides providing low back reflection, such angled connectors also facilitate in the plugging and unplugging of either of the detachable plug-in pump laser card assemblies 14 and 14' while the optical fiber amplifier 10 is still in operation. Similarly, the first half plug-in member 24' of the electrical connector 25' engages with the second half plug-in member 48' located on the base plate 12, thus, forming an electrical connection. Preferably, the electrical connector 25 comprising of members 24 and 28 and the electrical connector 25' comprising of members 24', and 28' are both a multipin connector and header set that are also commercially available. Moreover, as shown in FIG. 1, the edges 17' and 19' of the heat sink 20' of the detachable plug-in pump laser card assembly 14' slide into the second middle rail member 86 and the second side rail member 88. Thus, the rail members 86 and 88 guide the second detachable plug-in pump laser card assembly 14' into the second port 50' and ensure that proper electrical and optical connections are made between the second detachable plug-in pump laser card assembly 14' and the optical fiber amplifier 10. In the preferred embodiment, the respective optical connectors 23 and 23' and electrical connectors 25 and 25' are preferably aligned in the same plane or offset by a fixed distance to ensure that the optical connections are completely engaged before the electrical connections are engaged. Also, the optical connector couplings 54 and 54' mounted in the back wall 52 are mounted preferably such that each of the couplings 54 and 54' are malleable enough to provide proper alignment between the first half members 22 and 22' and the second half members 46 and 46' of the optical connectors 23 and 23', respectively.

Referring to FIG. 3, the first side wall 60 comprises two apertures 90, which help ventilate and/or dissipate any heat generated within the detachable plug-in pump laser card assembly 14. However, the shape and number of the apertures 90 may be varied to achieve heat dissipation within the detachable plug-in pump laser card assembly 14. Similarly, as shown in FIG. 2, the second side wall 84 in the second detachable plug-in pump laser card assembly 14' comprises two apertures 90' for heat dissipation.

Also, as shown in FIGS. 2, 3 and 4, the removable end 13 of the detachable plug-in pump laser card assembly 14 includes a front cover plate 32 having a heat sink top end 36 and an opposite printed circuit board bottom end 34. The heat sink top end 36 of the cover plate 32 is bent about 90° at the top and forms a ledge that is attached at the removable end 13 to the side of the heat sink 20 that comprises the plurality of fins 40. The front cover plate 32 can be attached by any standard commercially available fasteners, and in the preferred embodiment, the front cover plate 32 is fastened to the heat sink 20 by the use of metal screws 21, as shown in FIGS. 1 and 4. Further, as shown in FIGS. 2 and 4, the cover plate 32 comprises two apertures 38 that receive the light emitting diodes 30, and the cover plate 32 also includes a withdrawing member 44 in the form of a handle. The handle 44 is attached to the cover plate 32 for facilitating insertion and removal of the detachable plug-in pump laser card assembly 14.

Although a preferred embodiment of this invention and certain variations thereof have been described herein, various modifications and variations will be apparent to those skilled in the art without departing from the spirit or scope of the invention. Thus, it is intended that the present invention cover the modifications and variations of this invention provided they come within the scope of the appended claims and their equivalents.

What is claimed is:

1. A detachable plug-in pump laser card assembly having an insertion end for placement inside an optical fiber amplifier, comprising:
    a printed circuit board;
    a pump laser electrically coupled to said printed circuit board, a first surface of said pump laser being proximate to and substantially parallel to said printed circuit board;
    a heat sink connected to an opposite second surface of said pump laser;
    a first half plug-in member of an optical connector for removable engagement with a mating member, said first half plug-in member of said optical connector being secured to said printed circuit board;
    a first half plug-in member of an electrical connector for removable engagement with a mating member, said first half plug-in member of said electrical connector being secured to said printed circuit board; and
    a reel having an optical fiber wrapped there around, said reel being disposed between said printed circuit board and said heat sink, said optical fiber having a first end and a second end, said first end of said optical fiber being connected to said pump laser and said second end of said optical fiber being connected to said first half plug-in member of said optical connector.

2. The detachable plug-in pump laser card assembly of claim 1, wherein said first half plug-in member of said optical connector is positioned at said insertion end of said detachable plug-in pump laser card assembly, and wherein said first half plug-in member of said electrical connector is positioned at said insertion end of said detachable plug-in pump laser card assembly.

3. The detachable plug-in pump laser card assembly of claim 1, wherein said reel has a minimum bend diameter, and wherein said optical fiber wrapped around said reel has an aggregate length at least equal to the sum of a first distance from said pump laser to said reel, a second distance around the perimeter of said reel and a third distance from said reel to said first half plug-in member of said optical connector.

4. The detachable plug-in pump laser card assembly of claim 1, wherein said optical fiber provides a tangential path from said reel to said pump laser and wherein said optical fiber provides a tangential path from said reel to said first half plug-in member of said optical connector.

5. The detachable plug-in pump laser card assembly of claim 1, wherein said printed circuit board further comprises at least one light emitting diode secured to said printed circuit board, said light emitting diode being electrically coupled to said printed circuit board, said light emitting diode being positioned at a removable end opposite from said insertion end of said detachable plug-in pump laser card assembly.

6. The detachable plug-in pump laser card assembly of claim 5, further comprising a cover plate having a heat sink end and an opposite printed circuit board end, wherein said heat sink end of said cover plate is bent about 90° and is attached to said heat sink at a side opposite from where said pump laser is attached, and wherein said cover plate further comprises at least one aperture for receiving said light emitting diode.

7. The detachable plug-in pump laser card assembly of claim 6, wherein said cover plate further comprises a withdrawing member in the form of a handle attached to said cover plate.

8. The detachable plug-in pump laser card assembly of claim 1, wherein said heat sink further comprises a plurality of fins, said fins being positioned on a side of said heat sink opposite from where said pump laser is attached.

9. The detachable plug-in pump laser card assembly of claim 8, wherein said heat sink is made of aluminum.

10. The assembly of claim 1, wherein said optical fiber amplifier is an erbium doped optical fiber amplifier.

11. An optical fiber amplifier, comprising:
    an optical connector having a first half plug-in member and a second half plug-in member;
    an electrical connector having a first half plug-in member and a second half plug-in member;
    a base plate, wherein said second half plug-in member of said electrical connector is secured to said base plate, wherein said base plate further includes a first port having said second half plug-in member of said optical connector mounted thereon, said second half plug-in member of said optical connector being secured to said first port;
    a detachable plug-in pump laser card assembly having an insertion end and further comprising:
        a printed circuit board, wherein said first half plug-in member of said optical connector is secured to said printed circuit board for removable engagement with said second half plug-in member of said optical connector, wherein said first half plug-in member of said electrical connector is secured to said printed circuit board for removable engagement with said second half plug-in member of said electrical connector;

a pump laser electrically coupled to said printed circuit board, a first surface of said pump laser being proximate to and substantially parallel to said printed circuit board;

a heat sink connected to an opposite second surface of said pump laser; and a reel having an optical fiber wrapped there around, said reel being disposed between said printed circuit board and said heat sink, said optical fiber having a first end and a second end, said first end of said optical fiber being connected to said pump laser and said second end of said optical fiber being connected to said first half plug-in member of said optical connector;

wherein said detachable plug-in pump laser card assembly is received into said first port.

12. The optical fiber amplifier of claim 11, wherein said first half plug-in member of said optical connector is positioned at said insertion end of said detachable plug-in pump laser card assembly, and wherein said first half plug-in member of said electrical connector is positioned at said insertion end of said detachable plug-in pump laser card assembly.

13. The optical fiber amplifier of claim 11, wherein said reel has a minimum bend diameter, and wherein said optical fiber wrapped around said reel at least has an aggregate length equal to the sum of a first distance from said pump laser to said reel, a second distance around the perimeter of said reel and a third distance from said reel to said first half plug-in member of said optical connector.

14. The optical fiber amplifier of claim 11, wherein said optical fiber provides a tangential path from said reel to said pump laser, wherein said optical fiber provides a tangential path from said reel to said first half plug-in member of said optical connector.

15. The optical fiber amplifier of claim 11, wherein said first port further comprises a back wall having an optical connector coupling mounted through a first half section of said back wall, wherein said optical connector coupling has a first end for engagement with said first half plug-in member of said optical connector and a second end that is optically connected to said second half plug-in member of said optical connector.

16. The optical fiber amplifier of claim 15, wherein said first port further comprises a first side wall and a first side of a middle wall, said first side wall being connected to a first end of said back wall, said middle wall being connected to the center of said back wall, said first side wall being substantially parallel to said middle wall, and wherein said first side wall comprises a first side rail member facing the inside of said first port and wherein said first side of said middle wall comprises a first middle rail member facing the inside of said first port, said first side rail member being opposite to said first middle rail member.

17. The optical fiber amplifier of claim 16, wherein said first side wall has a plurality of apertures.

18. The optical fiber amplifier of claim 17, further comprising:

a second detachable plug-in pump laser card assembly comprising:

a printed circuit board;

a pump laser electrically coupled to said printed circuit board, a first surface of said pump laser being proximate to and substantially parallel to said printed circuit board;

a heat sink connected to an opposite second surface of said pump laser;

a first half plug-in member of an optical connector for removable engagement with a mating member, said first half plug-in member of said optical connector being secured to said printed circuit board;

a first half plug-in member of an electrical connector for removable engagement with a mating member, said first half plug-in member of said electrical connector being secured to said printed circuit board; and a reel having an optical fiber wrapped there around, said reel being disposed between said printed circuit board and said heat sink, said optical fiber having a first end and a second end, said first end of said optical fiber being connected to said pump laser and said second end of said optical fiber being connected to said first half plug-in member of said optical connector;

wherein said base plate further includes a second port comprising a second half section of said back wall, a second side of said middle wall and a second side wall, said second side wall being connected to an opposite second end of said back wall, said second side wall being substantially parallel to said middle wall, wherein said second side of said middle wall further comprises a second middle rail member facing the inside of said second port, said second side wall comprises a second side rail member facing the inside of said second port, said second middle rail member being opposite to said second side rail member, and wherein said second port is adapted to receive said second detachable plug-in pump laser card assembly.

19. The optical fiber amplifier of claim 18, wherein said second side wall has a plurality of apertures.

20. The optical fiber amplifier of claim 18, wherein each of said first side wall, said middle wall and said second side wall is made of stainless steel.

21. The optical fiber amplifier of claim 11, wherein said printed circuit board further comprises at least one light emitting diode secured to said printed circuit board, said light emitting diode being electrically coupled to said printed circuit board, said light emitting diode being positioned at a removable end opposite from sad insertion end of said detachable plug-in pump laser card assembly.

22. The optical fiber amplifier of claim 11, wherein said detachable plug-in pump laser card assembly further comprises a cover plate having a heat sink end and an opposite printed circuit board end, wherein said heat sink end of said cover plate is bent about 90° and forms a ledge that is attached to said heat sink at a side opposite from where said pump laser is attached, said cover plate having at least one aperture for receiving a light emitting diode.

23. The optical fiber amplifier of claim 22, wherein said cover plate further comprises a withdrawing member in the form of a handle attached to said cover plate.

24. The optical fiber amplifier of claim 11, wherein said optical fiber amplifier is an erbium doped optical fiber amplifier.

25. The optical fiber amplifier of claim 11, wherein said heat sink further comprises a plurality of fins, said fins being positioned opposite from the side of said heat sink where said pump laser is attached.

26. The optical fiber amplifier of claim 11, wherein said heat sink is made of aluminum.

* * * * *